(12) United States Patent
Okada et al.

(10) Patent No.: US 7,849,406 B2
(45) Date of Patent: Dec. 7, 2010

(54) APPARATUS AND METHOD FOR AUTHORING

(75) Inventors: Yuji Okada, Tokyo (JP); Katsunao Takahashi, Tokyo (JP); Wataru Fujikawa, Kanagawa (JP); Koichi Emura, Kanagawa (JP)

(73) Assignee: Panasonic Corporation, Osaka (JP)

( * ) Notice: Subject to any disclaimer, the term of this patent is extended or adjusted under 35 U.S.C. 154(b) by 752 days.

(21) Appl. No.: 10/491,903

(22) PCT Filed: May 8, 2003

(86) PCT No.: PCT/JP03/05737
§ 371 (c)(1),
(2), (4) Date: Apr. 16, 2004

(87) PCT Pub. No.: WO03/002953
PCT Pub. Date: Dec. 11, 2003

(65) Prior Publication Data
US 2004/0263529 A1 Dec. 30, 2004

(30) Foreign Application Priority Data
May 31, 2002 (JP) ............... 2002-160528

(51) Int. Cl.
*G06F 3/00* (2006.01)
(52) U.S. Cl. ............ 715/723; 715/721; 715/724; 715/731; 725/47; 386/52; 386/55
(58) Field of Classification Search ........... 725/47; 715/731, 721, 723, 24; 386/52, 55
See application file for complete search history.

(56) References Cited
U.S. PATENT DOCUMENTS
5,537,528 A * 7/1996 Takahashi et al. ........... 715/512
(Continued)

FOREIGN PATENT DOCUMENTS
EP 1094409 7/2001
(Continued)

OTHER PUBLICATIONS
Adobe Systems Inc., Adobe Premiere User Guide (c) 2000, pp. 199, 203; http://www.gatv.ssr.upm.es/~ltav/practicas/Premiere.pdf.*
(Continued)

*Primary Examiner*—Steven P Sax
*Assistant Examiner*—Andrey Belousov
(74) *Attorney, Agent, or Firm*—Greenblum & Bernstein, P.L.C.

(57) ABSTRACT

The present invention is designed to display a matrix plane on which a time axis and an axis of applicable levels corresponding to a predetermined keyword cross each other, arrange and display identifiers indicating scenes obtained by dividing a moving image file into predetermined segments on the matrix plane and decide, when the positions of the identifiers arranged on the matrix plane are moved to desired positions, the applicable levels corresponding to the positions of the identifiers arranged on the matrix plane as the applicable levels of the scene corresponding to the identifiers. This makes it possible to improve the operability of assignment of keywords and applicable levels to a picture scene and visually check the situation of assignment of the keywords and applicable levels.

15 Claims, 11 Drawing Sheets

U.S. PATENT DOCUMENTS

| | | | | |
|---|---|---|---|---|
| 5,610,653 | A | * | 3/1997 | Abecassis .................... 348/170 |
| 5,905,493 | A | * | 5/1999 | Belzer et al. ................. 715/835 |
| 6,262,732 | B1 | * | 7/2001 | Coleman et al. ............ 715/835 |
| 6,449,422 | B1 | * | 9/2002 | Ebisawa ....................... 386/52 |
| 6,918,081 | B1 | | 7/2005 | Jun |
| 7,124,366 | B2 | * | 10/2006 | Foreman et al. ............. 715/719 |
| 2002/0069218 | A1 | * | 6/2002 | Sull et al. ................. 707/501.1 |
| 2003/0177503 | A1 | * | 9/2003 | Sull et al. .................... 725/112 |
| 2004/0125121 | A1 | * | 7/2004 | Pea et al. ..................... 345/716 |

FOREIGN PATENT DOCUMENTS

| | | |
|---|---|---|
| GB | 2 323 699 | 9/1998 |
| JP | 11-175625 | 7/1999 |
| JP | 11-288424 | 10/1999 |
| JP | 2001-184371 | 7/2001 |
| JP | 2001-238172 | 8/2001 |
| JP | 2002-262228 | 9/2002 |
| JP | 2002-281438 | 9/2002 |
| JP | 2002-281449 | 9/2002 |
| WO | 00/45388 | 8/2000 |

OTHER PUBLICATIONS

English Language Abstract of JP 2002-281449.
English Language Abstract of JP 2002-281438.
English Language Abstract of JP 2002-262228.
English Language Abstract of JP 2001-184371.
English Language Abstract of JP 11-175625.
English Language Abstract of JP 11-288424.
"Development of MPEG-7 Applications by Miyasato et al.; published in"Pioneer R&D, vol. 11, No. 2, Sep. 2001, pp. 27-38, together with an English language Abstract of the same. Applicants note that this document is mentioned on p. 3 of the specification of the present application.
English Language Abstract of JP 2001-238172.

* cited by examiner

| TIME \ KEYWORD | SHOOT | GOAL | IMPORTANCE |
|---|---|---|---|
| 0:31~0:36 | 0.1 | | |
| 0:39~0:48 | | | 0.2 |
| 0:59~1:05 | 0.2 | | |
| 1:08~1:19 | 0.1 | | |
| 2:12~2:21 | 0.3 | 0.3 | |
| | | | |
| | | | |
| | | | |
| | | | |

FIG. 2

```xml
<?xml version="1.0" encoding="iso-8859-1"?>
<Mpeg7 xmlns="urn:mpeg:mpeg7:schema:2001"
xmlns:xsi="http://www.w3.org/2001/XMLSchema-instance"
xmlns:mpeg7="urn:mpeg:mpeg7:schema:2001"
xmlns:xml="http://www.w3.org/XML/1998/namespace"
xsi:schemaLocation ="urn:mpeg:mpeg7:schema:2001 .¥Mpeg7-2001.xsd">
    <Description xsi:type="ContentEntityType">
        <MultimediaContent xsi:type="VideoType">
            <Video>
                <TemporalDecomposition>
                    <VideoSegment id="Seg0">
                        <PointOfView viewpoint="Shoot">         ~206a
                            <Importance>
                                <Value>0.1</Value>              ~207a
                            </Importance>
                        </PointOfView>
                        <MediaTime>
                            <MediaRelTimePoint
mediaTimeBase="../../MediaLocator[1]">PT31S</MediaRelTimePoint>
                            <MediaDuration>PT5S</MediaDuration>
                        </MediaTime>
                    </VideoSegment>
                    <VideoSegment id="Seg1">
                        <PointOfView viewpoint="Importance"> ~206b
                            <Importance>
                                <Value>0.2</Value>              ~207b
                            </Importance>
                        </PointOfView>
                        <MediaTime>
                            <MediaRelTimePoint
mediaTimeBase="../../MediaLocator[1]">PT39S</MediaRelTimePoint>
                            <MediaDuration>PT9S</MediaDuration>
                        </MediaTime>
                    </VideoSegment>
                </TemporalDecomposition>
            </Video>
        </MultimediaContent>
    </Description>
</Mpeg7>
```

FIG. 3

APPARATUS AND METHOD FOR AUTHORING

TECHNICAL FIELD

The present invention relates to an authoring apparatus and authoring method which assigns index information to a moving image.

BACKGROUND ART

Saving a moving image as a digital file is becoming a widespread practice in recent years. With an increasing number of moving images saved, it is becoming more and more difficult to quickly retrieve desired files from an enormous amount of moving image files and efficiently control them. To solve this problem, there are proposals on methods for assigning index information to a moving image, picture retrieval and picture summary using index information.

One of these methods is disclosed in the Unexamined Japanese Patent Publication No. 11-288424. This publication specifically presents a method of preparing keyword information, etc., associated with a specific time segment of a picture as a file aside from a moving image file and using the file for retrieval, etc.

It is a general practice to describe an index information file in a widespread XML format, and nowadays there is also a proposal on an MPEG7 standard which is intended to describe picture contents.

As index information, creating a table of keywords corresponding to picture contents associated with time segments of a picture is effective for retrieval using keywords. The MPEG7 standard also proposes to assign an applicable level showing the level at which the keyword applies to a picture. The MPEG7 standard handles a keyword and applicable level under the names "PointOfView" (viewpoint) and "Importance" (score) respectively. How to use this applicable level will be explained below.

Suppose there is a sports picture which lasts 30 minutes, for example. Once a keyword "Importance" is assigned to an important part (picture segment) of the picture beforehand, when a digest of this sports picture is created, it is possible to easily create the digest picture by combining only time segments to which "Importance" is assigned.

However, the time of the digest picture is a sum of times to which "Importance" is assigned. Therefore, the above described method of creating a digest picture cannot respond to a request, for example, for setting the duration of the digest picture to 3 minutes or 1 minute.

In such a case, if the applicable level is assigned to a keyword "Importance", it is possible to respond to the aforementioned request for specifying the duration of the digest picture by summing time segments in descending order of applicable levels.

For example, suppose ten levels from 1.0 to 0.1 in increments of 0.1 are used as applicable levels according to the degree of importance and assigned to a picture. When a one-minute digest is requested, time segments to which an applicable level of 1.0 is assigned are summed first. If the total time falls short of 1 minute, time segments of an applicable level of 0.9 are further summed. In this way, by assigning time segments in descending order of applicable levels, it is possible to create a digest picture so as to further approximate to the desired 1 minute.

Of course, when a digest picture is reproduced, it is possible to reproduce the digest in a consistent time sequence by reproducing the respective time segments in the time sequence.

One example of an authoring program which assigns keywords is described in "Development of MPEG-7 Application" (Pioneer R&D Vol. 11 No. 2 (September 2001) page 27). As with this example, in a conventional authoring program, there is a proposal on a GUI (graphic user interface) designed for a user to directly input numerical values and characters to each scene to input index information.

However, according to the method using a conventional authoring program, it is possible to assign keywords and applicable levels to scenes which are time segments of a picture, but it is not possible to intuitively or visually grasp the result of assigning the keywords and applicable levels to the respective scenes. Thus, no consideration is given to checking the result of assigning the keywords and applicable levels among the respective scenes, that is, checking how the keywords and applicable levels are assigned to the entire picture.

For this reason, it is difficult to figure out whether the applicable levels are assigned among the respective scenes in a balanced manner or to which part high applicable levels are assigned, etc., resulting in an enormous time being required to carry out an authoring operation as has been imagined.

Furthermore, since keywords and applicable levels need to be manually input to each scene each time, such an operation is time-consuming.

DISCLOSURE OF INVENTION

It is an object of the present invention to improve the operability in assigning keywords and applicable levels to picture scenes and enable a situation of assigned keywords and applicable levels to be visually checked.

The present invention displays a matrix plane on which a time axis and an axis of applicable levels corresponding to a predetermined keyword cross each other, displays identifiers indicating scenes obtained by dividing a moving image file into predetermined segments arranged on the matrix plane and determines, when a user moves the position of an identifier on the matrix plane to a desired position, an applicable level corresponding to the position of the identifier placed on the matrix plane as the applicable level of the scene corresponding to the identifier.

This allows keywords and applicable levels corresponding to scenes to be input on the matrix plane, and can thereby improve the operability in assigning keywords and applicable levels to scenes and visually check a situation of assignment of keywords and applicable levels.

BRIEF DESCRIPTION OF DRAWINGS

FIG. 2 is a configuration diagram of metadata according to Embodiment 1;

FIG. 3 illustrates a file of metadata using XML according to Embodiment 1;

BEST MODE FOR CARRYING OUT THE INVENTION

Embodiment 1

Figure 1:
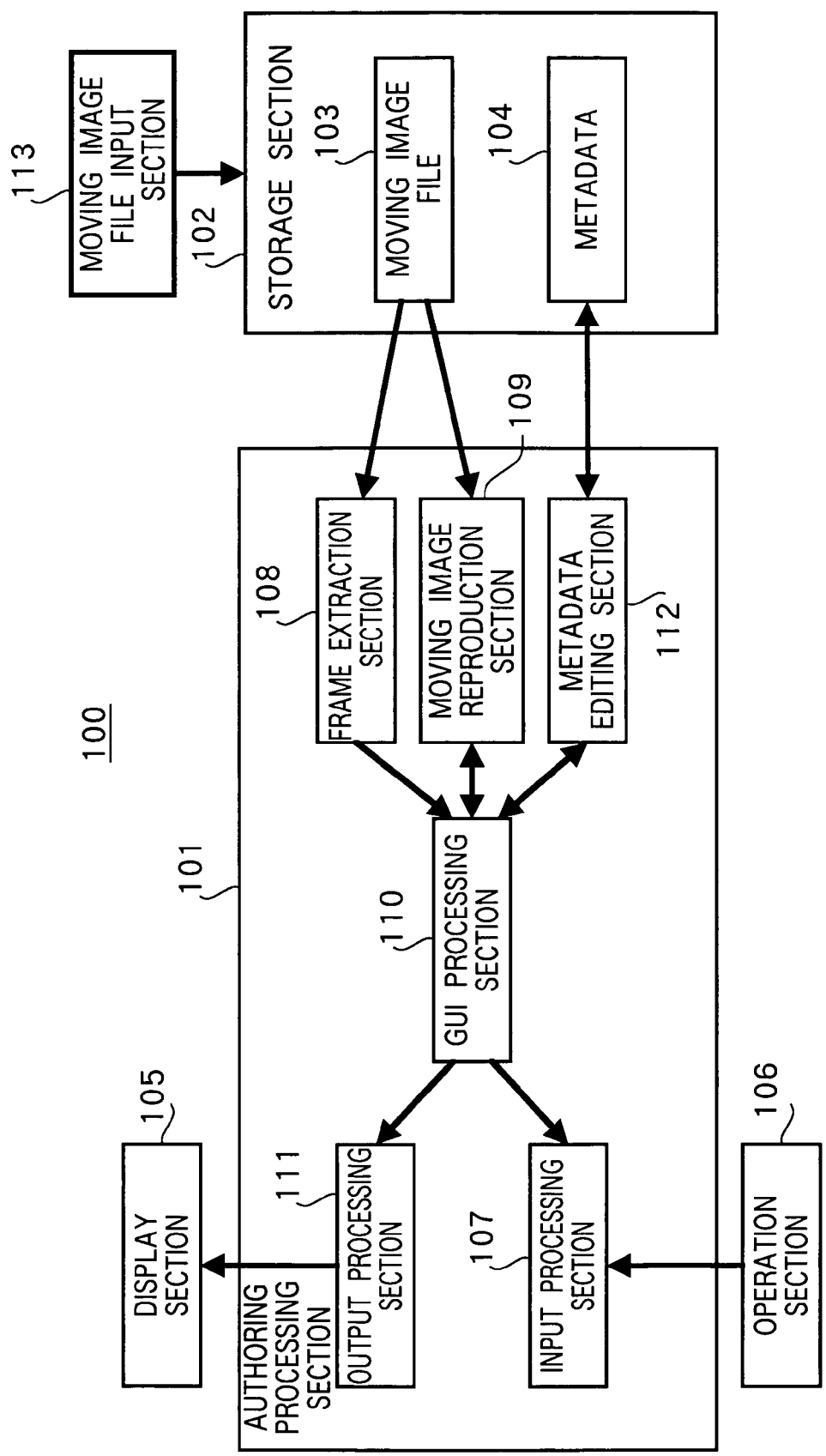
FIG. 1 is a block diagram of an authoring apparatus according to Embodiment 1 of the present invention.

With reference now to the attached drawings, Embodiment 1 of the present invention will be explained below. First, the configuration of an authoring apparatus according to Embodiment 1 will be explained. FIG. 1 is a block diagram of the authoring apparatus according to Embodiment 1.

The authoring apparatus 100 according to Embodiment 1 is provided with an authoring processing section 101 which carries out various types of processing about authoring.

The authoring apparatus 100 is provided with a moving image file input section 113 as an apparatus to input a moving image file to be subjected to authoring by the authoring processing section 101.

The moving image file input section 113 may be, for example, a video camera, a storage medium storing a moving image file such as CD and DVD or an apparatus which distributes a moving image by means of broadcasting or communication, etc.

Furthermore, the authoring apparatus 100 is provided with a storage section 102 that stores various types of information used by the authoring processing section 101. The storage section 102 may be a disk, etc., incorporated in the authoring apparatus 100 or may be a storage medium such as an external server.

The storage section 102 stores a moving image file 103 to be subjected to authoring input from the moving image file input section 113. The storage section 102 also stores index information created as a result of the authoring, that is, metadata 104. Here, the storage section 102 may be constructed in a mode in which the moving image file 103 and metadata 104 are saved in different storage media or a mode in which they are stored in the same storage medium.

Here, the metadata 104 will be explained using FIG. 2. FIG. 2 is a configuration diagram of metadata according to Embodiment 1.

As shown in FIG. 2, the metadata is stored as a table describing a time 201 on the vertical axis, a plurality of keywords 202 on the horizontal axis and an applicable level 203 at a position the time 201 and keyword 202 cross each other.

Furthermore, the time 201 on the vertical axis is divided into scenes. In the example of FIG. 2, the vertical axis is represented by the time 201, but it may also be simply represented by scene numbers.

Furthermore, various methods are proposed for transforming the metadata table into a file, but this embodiment uses XML based on the MPEG7 standard.

Here, metadata transformed into a file using XML will be explained using FIG. 3. FIG. 3 illustrates a file of metadata using XML according to Embodiment 1. FIG. 3 corresponds to the table shown in FIG. 2, but for simplicity of explanation, it only describes time segments 0:31 to 0:36 and 0:39 to 0:48 out of the time segments in the table shown in FIG. 2.

The XML file shown in FIG. 3 describes two segments 204a and 204b. As indicated by reference numerals 205a and 205b in the figure, the two segments 204a and 204b describe time information corresponding to the segments 0:31 to 0:36 and 0:39 to 0:48 shown in FIG. 2. Furthermore, as indicated by reference numerals 206a and 206b in the figure, the keywords "Shoot" and "Importance" shown in FIG. 2 are described in the in the field of PointOfView. Furthermore, as indicated by reference numerals 207a and 207b in the figure, the two segments 204a and 204b describe the applicable level (Importance) corresponding to the keywords "Shoot" and "Importance."

Thus, by describing the metadata in XML, it is possible to provide the metadata with versatility.

Here, SGML may also be used as a markup description language. Furthermore, any language other than markup description languages may also be used as the metadata scheme.

Here, referring to FIG. 1 again, the authoring apparatus 100 will be explained further.

The authoring apparatus 100 is provided with a display section 105 that displays the result of processing by the authoring processing section 101 and an operation section 106 for inputting various types of information to the authoring processing section 101. The operation section 106 may be constructed of a keyboard and mouse, etc.

Then, the configuration of the authoring processing section 101 will be explained. The authoring processing section 101 is provided with an input processing section 107 that takes in the user's authoring operation information input from the operation section 106.

Furthermore, the authoring processing section 101 is provided with a frame extraction section 108. The frame extraction section 108 reads the target moving image file 103 prior to the authoring operation by the user and performs scene segmentation. Scene segmentation may be realized in time units such as 10-second units or by comparing before and after each frame image making up a moving picture and detecting points at which images become discontiguous, that is, "cuts," those points may be used as segmentation points.

Furthermore, after performing scene segmentation using the above described technique, the frame extraction section 108 extracts representative frame images of the respective scenes. The representative frame image may be a first frame image of each scene or may be a frame image located in the center of time segmentation. In recent years, a technology of extracting a frame image including characteristic images such as a face as a representative frame image using an image characteristic recognition technology is also developed and so this technology may also be used.

The authoring processing section 101 is further provided with a moving image reproduction section 109 that reads and reproduces the moving image file 103. Furthermore, the moving image reproduction section 109 also reproduces a digest picture.

Furthermore, the authoring processing section 101 is provided with a GUI processing section 110 that combines frame images extracted from the frame extraction section 108 into a GUI (graphic user interface) for authoring. The GUI processing section 110 reflects contents input from the input processing section 107 in the GUI and sends the contents to an output processing section 111. The GUI processing section 110 also generates a digest picture.

The output processing section 111 outputs the GUI to the display section 105 and the display section 105 displays the GUI for the user.

Furthermore, the authoring processing section 101 is provided with a metadata editing section 112 that associates a keyword and applicable level with each scene and updates the metadata 104 in the storage section 102.

Then, the authoring GUI combined by the GUI processing section 110 will be explained.

The GUI according to this embodiment is characterized in that the user arranges identifiers (representative frame images) indicating picture scenes on a matrix plane whose horizontal axis shows a time line and whose vertical axis shows an applicable level corresponding to a predetermined keyword to determine the applicable level of a picture scene corresponding to a specific keyword.

Figure 4:
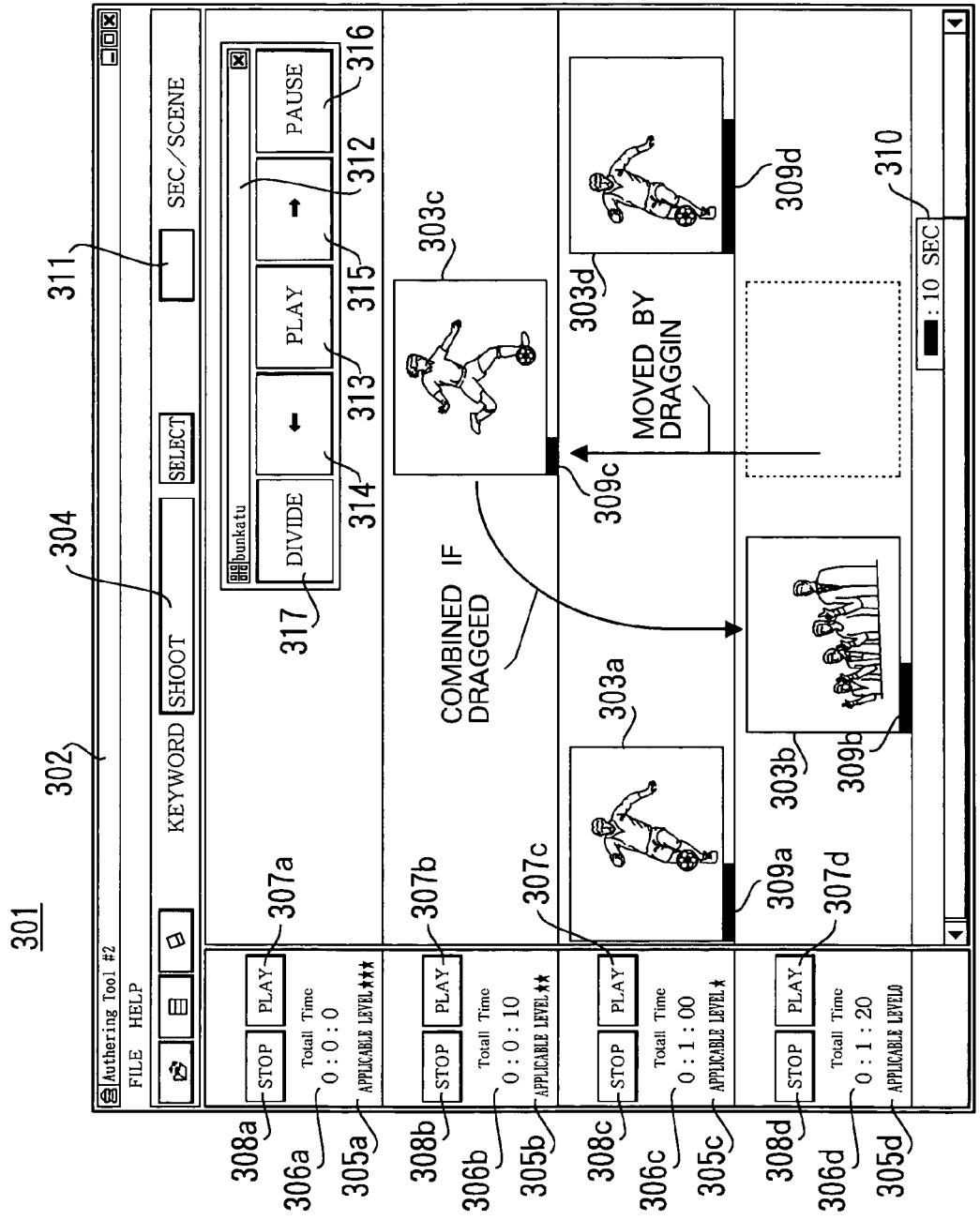
FIG. 4 illustrates a configuration of a GUI according to Embodiment 1.

Hereafter, the authoring GUI combined by the GUI processing section 110 will be explained using FIG. 4. FIG. 4 illustrates a configuration of a GUI according to Embodiment 1.

A main window 302 of an authoring GUI 301 is a matrix plane with the horizontal axis showing a time and the vertical axis showing an applicable level.

Furthermore, the main window 302 arranges representative frame images (scene frame images) 303a to 303d of the scenes extracted from the moving image file 103 at positions corresponding to their respective times. These scene frame images 303a to 303d are provided one for each picture scene.

Furthermore, a keyword window 304 that specifies a keyword to be assigned to each scene is provided at the top of the main window 302 of the authoring GUI 301. The user may select a keyword from a keyword list including prepared keywords or may directly input a keyword.

Furthermore, a plurality of applicable levels 305a to 305d are described in ascending order in the vertical direction on the left side of the main window 302. Furthermore, total times 306a to 306d when a digest picture is created using the respective applicable levels 305a to 305d are described near above the applicable levels 305a to 305d.

Furthermore, Play buttons 307a to 307d to reproduce digest pictures created using their respective applicable levels 305a to 305d and Stop buttons 308a to 308d are arranged above the applicable levels 305a to 305d.

Furthermore, time bars 309a to 309d that indicate the lengths of the scenes corresponding to the scene frame images 303a to 303d are shown beneath the scene frame images 303a to 303d.

Furthermore, a time scale 310 that indicates the time scale of the time bars 309a to 309d is displayed at the bottom of the main window 302. The time bars 309a to 309d are expressed by the lengths of the bars based on the time scale 310.

Providing such time bars 309a to 309b makes it possible to visually grasp the length of each scene and makes it easier to operate the reproduction time by specifying the applicable levels 305a to 305d.

Furthermore, these time bars 309a to 309d are useful because these time bars allow each total time 306a to 306d by applicable level 305a to 305d to be estimated when each total time 306a to 306d by applicable level 305a to 305d is adjusted or when the applicable level of each scene is changed. Furthermore, the time bars 309a to 309d are useful also because they allow the length of each scene to be intuitively grasped when the scene lengths are balanced among the scenes.

Here, the positions of the time bars 309a to 309d are not limited to positions below the scene frame images 303a to 303d if their proportion in the scene is appreciated and may be placed at any positions up, down, right or left.

Furthermore, a scene interval input section 311 is placed at the top of the main window 302 to enter a time interval to divide a scene when dividing the scene at predetermined intervals instead of dividing it at cut points. This allows the user to create a scene of a desired length by entering a desired interval. This prevents the length of a scene from becoming too long in the case of a moving image with few cut points.

The GUI 301 is also provided with a division window 312 used to divide a scene into desired lengths. The division window 312 is provided with a Play button 313 to reproduce a selected scene, a frame rewind button 314 to rewind and reproduce frames, a frame Play button 315 to reproduce frames, a Pause button 316 to show a still image and a division button 317 to divide a scene at the position where it is currently being reproduced.

When the user wants to divide a desired scene, the user selects the desired scene by clicking on it, then reproduces the scene using various buttons 313 to 316, detects the desired position and presses the division button 317, and can thereby divide the scene.

Figure 5:
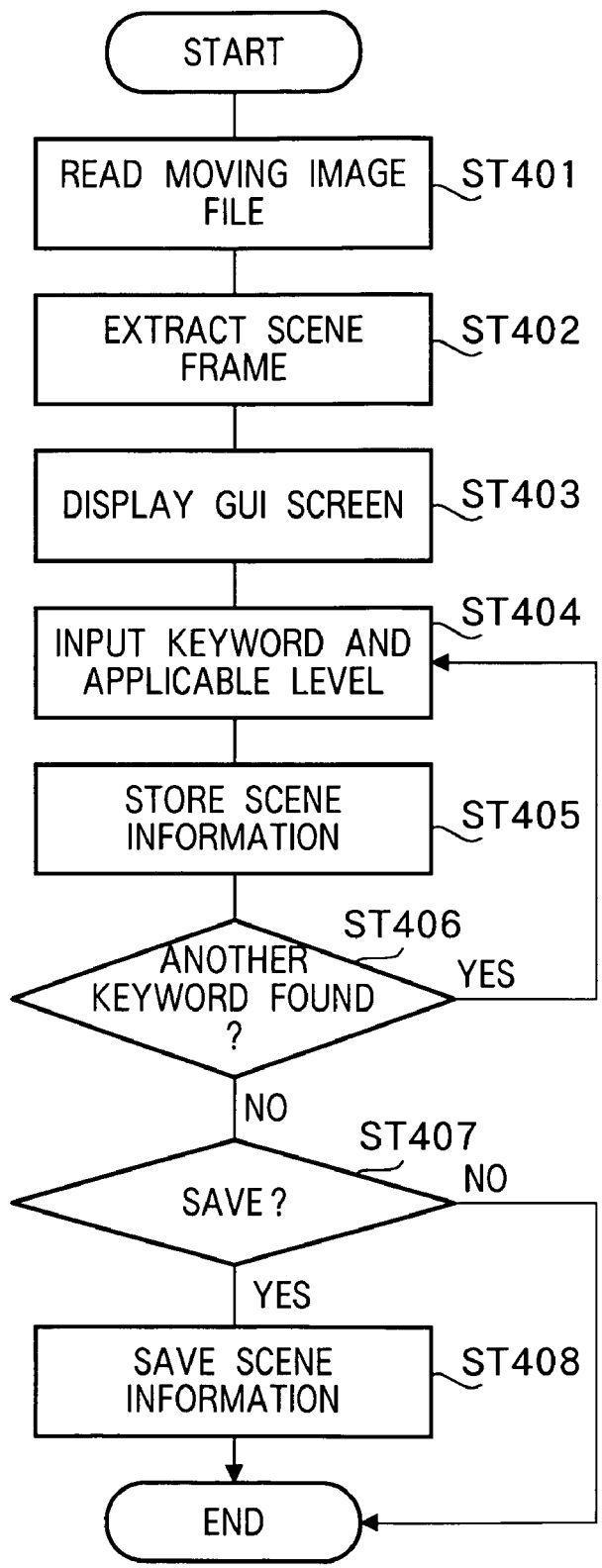
FIG. 5 is a flow chart of authoring processing of an authoring apparatus according to Embodiment 1.

Then, the processing flow of the authoring apparatus 100 accompanying the authoring operation by the user will be explained using FIG. 5. FIG. 5 is a flow chart of authoring processing by the authoring apparatus according to Embodiment 1.

First, the authoring apparatus 100 refers to the moving image file 103 of the storage section 102 and displays a list of moving image files on the display section 105. Then, when the user select a moving image file as the authoring target by operating the operation section 106, the input processing section 107 sends the selection information of the moving image file 103 to the GUI processing section 110. Then, the GUI processing section 110 sends this selection information to the frame extraction section 108.

Then, the frame extraction section 108 reads the moving image file 103 selected by the user (ST401). Then, the frame extraction section 108 divides the moving image file 103 read at specific time intervals and extracts scene frame images (ST402). The frame extraction section 108 then sends the extracted scene frame images to the GUI processing section 110.

Then, the GUI processing section 110 generates the main window 302, arranges the scene frame images extracted by the frame extraction section 108 at predetermined positions of the main window 302 and sends the scene frame images to the output processing section 111. Then, the output processing section 111 displays the main window 302 with these scene frame images arranged at the predetermined positions on the display section 105 (ST403).

The processing in ST403 will be explained in detail. The GUI processing section 110 arranges the plurality of scene frame images 303a to 303d on the main window 302 from left to right in chronological order first. Then, the GUI processing section 110 arranges all the scene frame images 303a to 303d at the position of the applicable level 0 on the vertical axis. Therefore, the scene frame images 303a to 303d are arranged on the column of the applicable level 0 in chronological order in the time axis direction in a state before the authoring operation.

When the scene frame images 303a to 303d are already assigned their applicable levels, it is also possible to arrange the scene frame images 303a to 303d at positions corresponding to the applicable levels assigned to the scene frame images 303a to 303d.

Then, the user specifies a keyword in the keyword window 304 by operating the operation section 106. Then, the user drags & drops the scene frame images 303a to 303d to move them in the vertical direction and places them at the appropriate applicable levels (degree of applicability) according to the keyword entered.

In response to this, the input processing section 107 inputs the applicable levels corresponding to the keyword entered by the user and the scene frame images 303a to 303d arranged in the GUI processing section 110 (ST404). Then, the GUI processing section 110 sends the applicable levels corresponding to the keyword entered and the scene frame images 303a to 303d to the metadata editing section 112.

The metadata editing section 112 associates the applicable levels with the keyword of the scenes corresponding to the scene frame images 303a to 303d and temporarily stores the authoring operation contents in a storage section such as a system RAM (ST405).

In this mode, with regard to the update information of the metadata 104, the metadata editing section 112 temporarily stores the authoring operation contents in a storage section such as a system RAM and updates all the metadata 104 after the authoring operation is completed, but the metadata 104 may also be updated in real time during the authoring operation.

Then, the authoring apparatus 100 repeats processes in ST404 and ST405 for every keyword entered by the user (ST406).

In this way, a plurality of keywords can be assigned to one scene.

Then, after the authoring operation is completed, when the user selects to save the metadata 104 in a scene (file) corresponding to the respective scene frame images 303a to 303d (ST407), the metadata editing section 112 saves the stored metadata as scene information (ST408) and finishes the processing.

In this way, a keyword and applicable level corresponding to each scene of a moving image file can be assigned not through conventional direct inputs of numerical values but through a drag & drop operation on the scene frame image in the main window 302. This can improve the operability significantly.

Furthermore, the user can visually grasp the values of the applicable levels assigned to the respective scenes at a glance. This improves the efficiency in grasping the overall situation and modifying the applicable levels.

Figure 6:
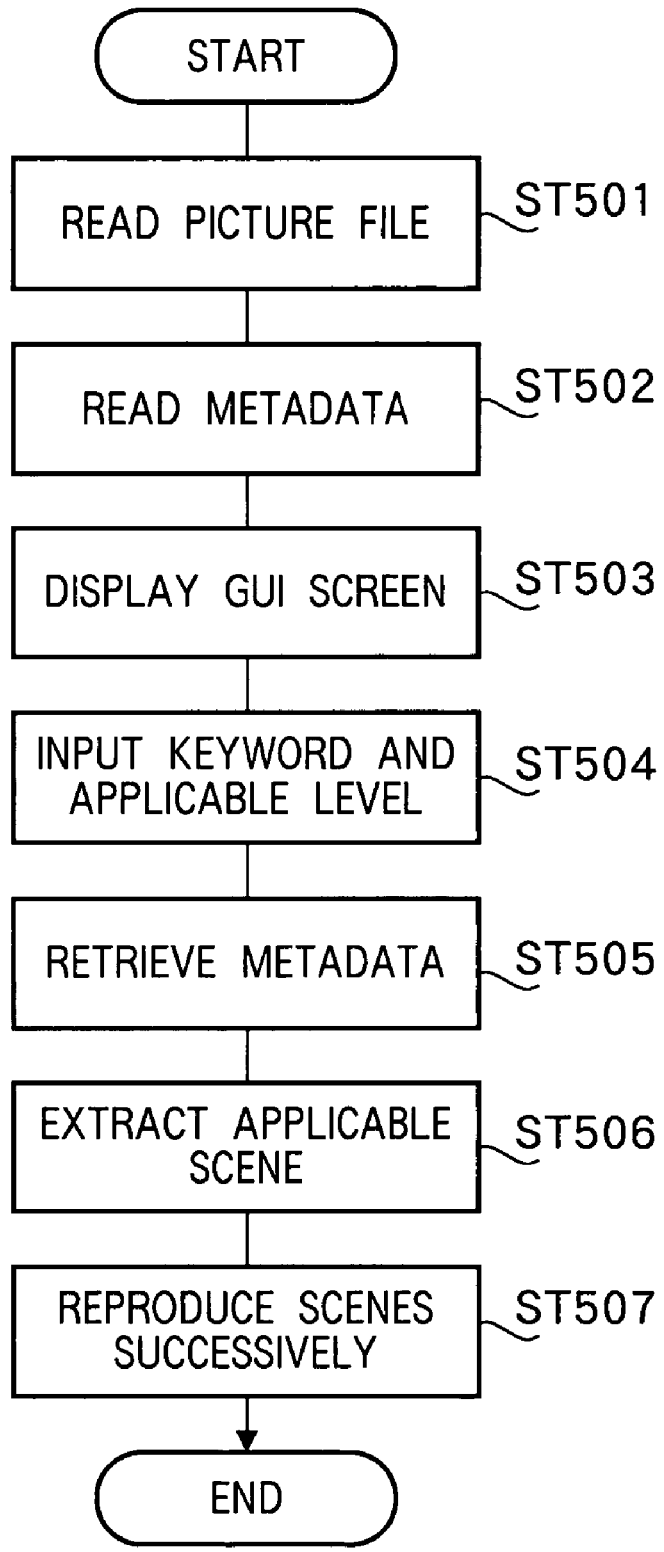
FIG. 6 is a flow chart of reproduction of a digest picture by the authoring apparatus according to Embodiment 1.

Then, reproduction of a digest picture using metadata by the authoring apparatus 100 according to Embodiment 1 will be explained using FIG. 6. FIG. 6 is a flow chart of reproduction of a digest picture by the authoring apparatus according to Embodiment 1.

When the user wants to see only a digest of importance scenes from, for example, a there-hour sports moving image file, reproduction of a digest picture is an operation which generates and reproduces a desired digest from the moving image file using metadata created using the aforementioned method. Or reproduction of a digest picture may also be performed in a mode in which the processing which will be explained below is programmed and a computer reads and executes this program.

First, the moving image reproduction section 109 of the authoring apparatus 100 confirms the existence of the moving image file 103 specified by the user, reads the specified moving image file 103 and inputs it to the GUI processing section 110 (ST501).

Then, the metadata editing section 112 of the authoring apparatus 100 retrieves and reads the metadata 104 associated with the moving image file 103 and inputs the metadata to the GUI processing section 110 (ST502).

Then, the GUI processing section 110 generates the main window 302 (GUI screen), sends it to the display section 105 through the output processing section 111 and the display section 105 displays the main window 302 (ST503).

The order from ST501 to 503 may be changed.

Then, when the user who sees the main window 302 enters an applicable level and keyword by operating the operation section 106, the GUI processing section 110 arranges the scene frame images of the moving image file specified by the user in ST501 at the positions corresponding to the applicable level of the keyword entered in the main window 302.

In this way, the user can visually recognize the scenes arranged at the respective applicable levels.

Then, when the user sees the main window 302 and presses the Play button 307a to 307d corresponding to the desired applicable level, the input processing section 107 inputs the applicable level and keyword of the depressed Play button 307a to 307d to the GUI processing section 110 (ST504).

Next, the GUI processing section 110 retrieves the metadata 104 read in ST502 (ST505), extracts scene frame images whose applicable level is equal to or higher than that of the user-specified keyword and creates a list of the extracted scene frame images (ST506). Then, with reference to the list created in ST506, the GUI processing section 110 reproduces the moving image files (scenes) 103 corresponding to the list successively (ST507).

In this way, a digest picture corresponding to the user-specified keyword and applicable level is created using the metadata.

However, the user's specifying the applicable level alone can not necessarily obtain the digest picture of a desired reproduction time. For the user, it is preferable to obtain a digest picture of an appropriate reproduction time. For example, if it is possible to constantly obtain a 30-second digest when the applicable level 3 305a is specified, a 1-minute digest when the applicable level 2 305b is specified and a 2-minute digest when the applicable level 1 305c is specified, the user can view the picture according to the user's free time.

To realize such a service, it is necessary to create index information (metadata) in such a way that the reproduction time at each applicable level becomes appropriate at the time point of the authoring operation.

For this purpose, according to Embodiment 1, as shown in FIG. 4, each total time 306a to 306d is displayed when a digest picture is created using each applicable level 305a to 305d. This allows the user to carry forward the authoring operation while grasping the extent of the reproduction time corresponding to the applicable level specified.

Furthermore, by adopting the total time 306a to 306d of a scene having an applicable level equal to or higher than each applicable level 305a to 305d, it is possible to secure consistency with the scenes used by the user and further increase convenience. However, the total time 306a to 306d may also be a total time of scenes having the sane applicable level 305a to 305d.

Figure 7:
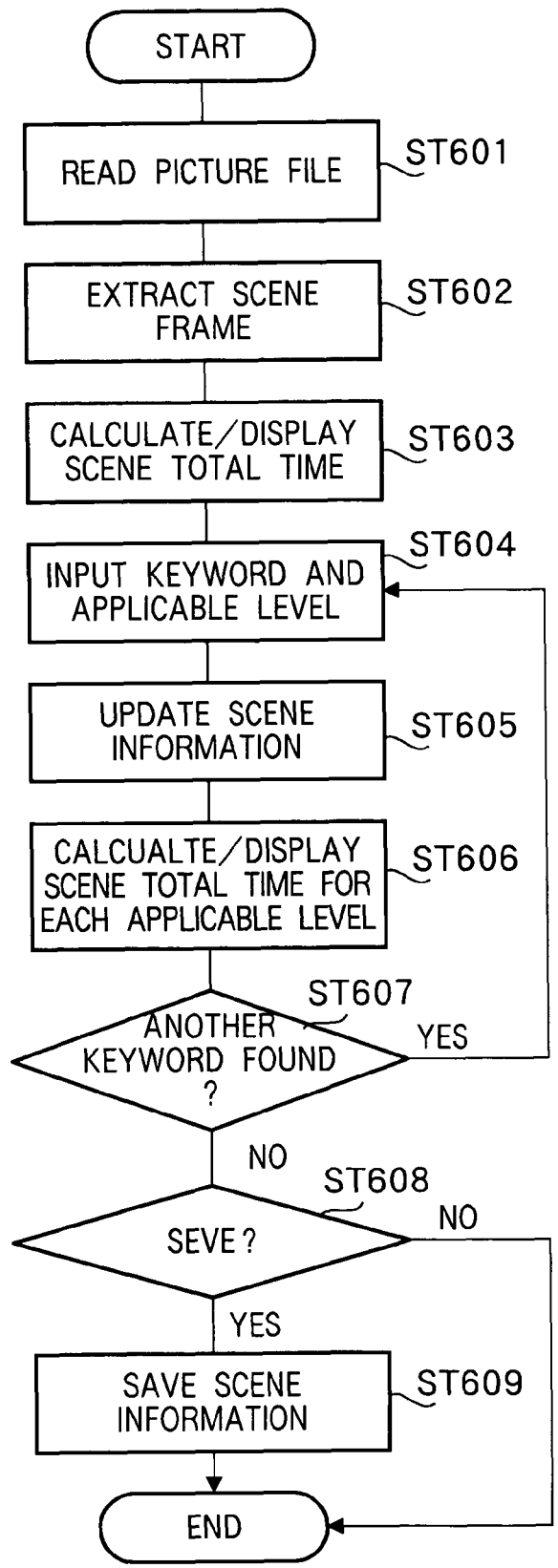
FIG. 7 is a flow chart showing a total time of a digest picture of an authoring processing apparatus according to Embodiment 1.

Then, the processing of displaying the total time 306a to 306d of a digest picture by the GUI processing section 110 will be explained using FIG. 7. FIG. 7 is a flow chart showing a total time of a digest picture by the authoring apparatus 100 according to Embodiment 1.

First, the frame extraction section 108 reads the moving image file 103 selected by the user (ST601). Then, the frame extraction section 108 divides the moving image file read at specific time points of a scene, extracts scene frame images and inputs them to the GUI processing section 110 (ST602).

At this time, the GUI processing section 110 recognizes the length of each scene and outputs the GUI 301, time bars 309a to 309d and time scale 310 to the display section 105 through the output processing section 111. Then, the display section 105 displays the time bars 309a to 309d and time scale 310 on the main window 302.

Then, the GUI processing section 110 calculates the total times 306a to 306d of the scenes included in the respective applicable level 305a to 305d, outputs the calculation result to the display section 105 through the output processing section 111 and the display section 105 displays the total times 306a to 306d on the GUI 301 (ST603).

Then, to update the keyword and applicable levels, when the user inputs a new keyword and drags & drops the scene frame images 303a to 303d up and down, the input processing section 107 inputs the applicable levels 305a to 305d corresponding to the keyword and the positions at which the scene frame images 303a to 303d are arranged to the GUI processing section 110 (ST604).

Then, the GUI processing section 110 changes the keyword and applicable levels of the scene frame images 303a to 303d to the input keyword and applicable levels and thereby updates the index information of the scene frame images 303a to 303d (ST605).

At this time, the GUI processing section 110 recalculates and displays the total times 306a to 306d for the respective changed applicable levels 305a to 305d (ST606).

Furthermore, when the user inputs another keyword, the GUI processing section 110 repeats the processing from ST604 to ST606 (ST607).

Then, after the authoring operation is completed, when the user selects to save the updated scene information in the scenes (files) corresponding to the respective scene frame images 303a to 303d (ST608), the metadata editing section 112 saves the stored scene information (ST609) and finishes the processing.

Then, the adjustment of the length of each scene by the authoring apparatus 100 will be explained. As explained using the flow chart in FIG. 5, when reading a moving image file, the authoring apparatus 100 according to Embodiment 1 creates a plurality of scenes by automatically dividing the moving image file into time segments. The division method may be division at specific time intervals such as 10 seconds or division at change points of scenes.

However, from the standpoint of time adjustment and the standpoint of adequacy according to the contents, the start and end points of a scene are preferably made changeable by the person who is carrying out the authoring operation. For example, when a goal scene of a soccer picture is divided into scenes, cut detection or division at 10-second intervals may result in inconvenience such as the scene accompanied by unnecessary images or contrarily the image tailing off.

The start and end points of a scene may be adjusted by directly editing time information, but using this authoring apparatus 100 can carry forward the operation more efficiently.

In the authoring apparatus 100 of Embodiment 1, two scenes are combined by dragging & dropping a certain scene frame image to another scene frame image placed before or after the scene frame image. Thus, it is possible to combine scenes easily in the main window 302.

Furthermore, clicking on a scene frame image causes the scene to be reproduced from the beginning to the end.

Furthermore, in this authoring apparatus 100, the moment the user reproduces a predetermined scene, the division window 312 having the Play button 313, frame rewind button 314, frame Play button 315, Pause button 316 to display a still image and the division button 317 appears. Then, when the user stops the scene at a desired position using the Pause button 316, further positions and adjusts the scene using the frame rewind button 314 and frame Play button 315 and presses the division button 317, one scene is divided into two portions. Such a structure of the GUI can be easily developed using a programming language such as Java®.

This makes it possible to detect desired cut points while reproducing a picture scene in the main window 302 and simply divide the picture scene.

On the other hand, when there is a need for adjusting start and end points of a scene for a plurality of keywords as shown in ST406 in FIG. 5, it takes time to adjust start and end points of the scene for each keyword.

Noticing the fact that even different keywords frequently have the same scene start and end points, this embodiment is adapted in such a way that once time segmentation on a certain keyword is adjusted and then time segmentation on another keyword is adjusted, the time segmentation adjusted for the one keyword can be taken over by the other keyword.

For example, a goal scene in soccer is one of shoot scenes in which a score is obtained and often has the same start or end points of a time segment, and therefore if a time segmentation edited for a shoot is taken over by editing of a goal, the same editing operation need not be performed over again, which improves the operation efficiency.

Figure 8:
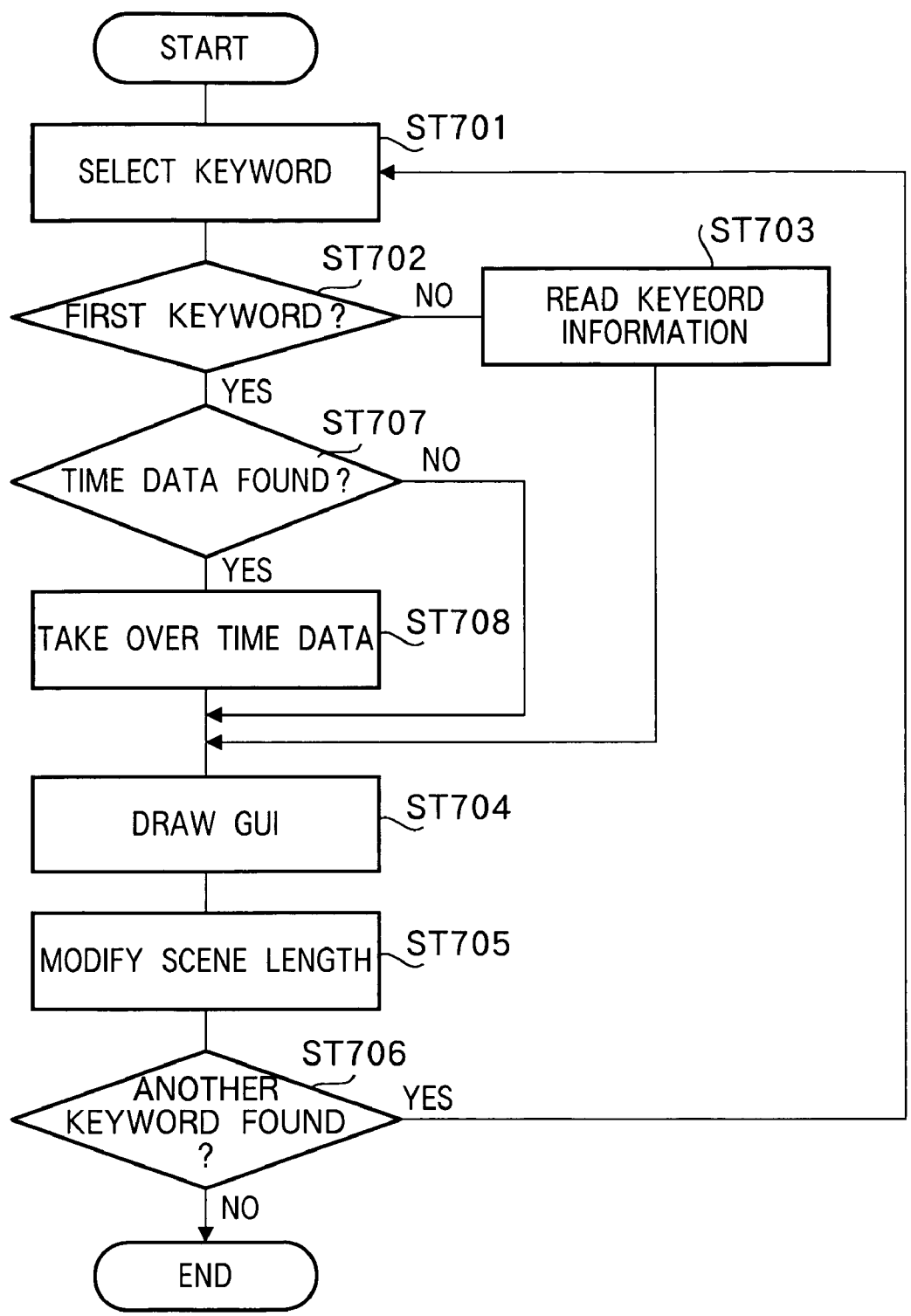
FIG. 8 is a flow chart of scene length adjustment by the authoring apparatus according to Embodiment 1.
Figure 9:
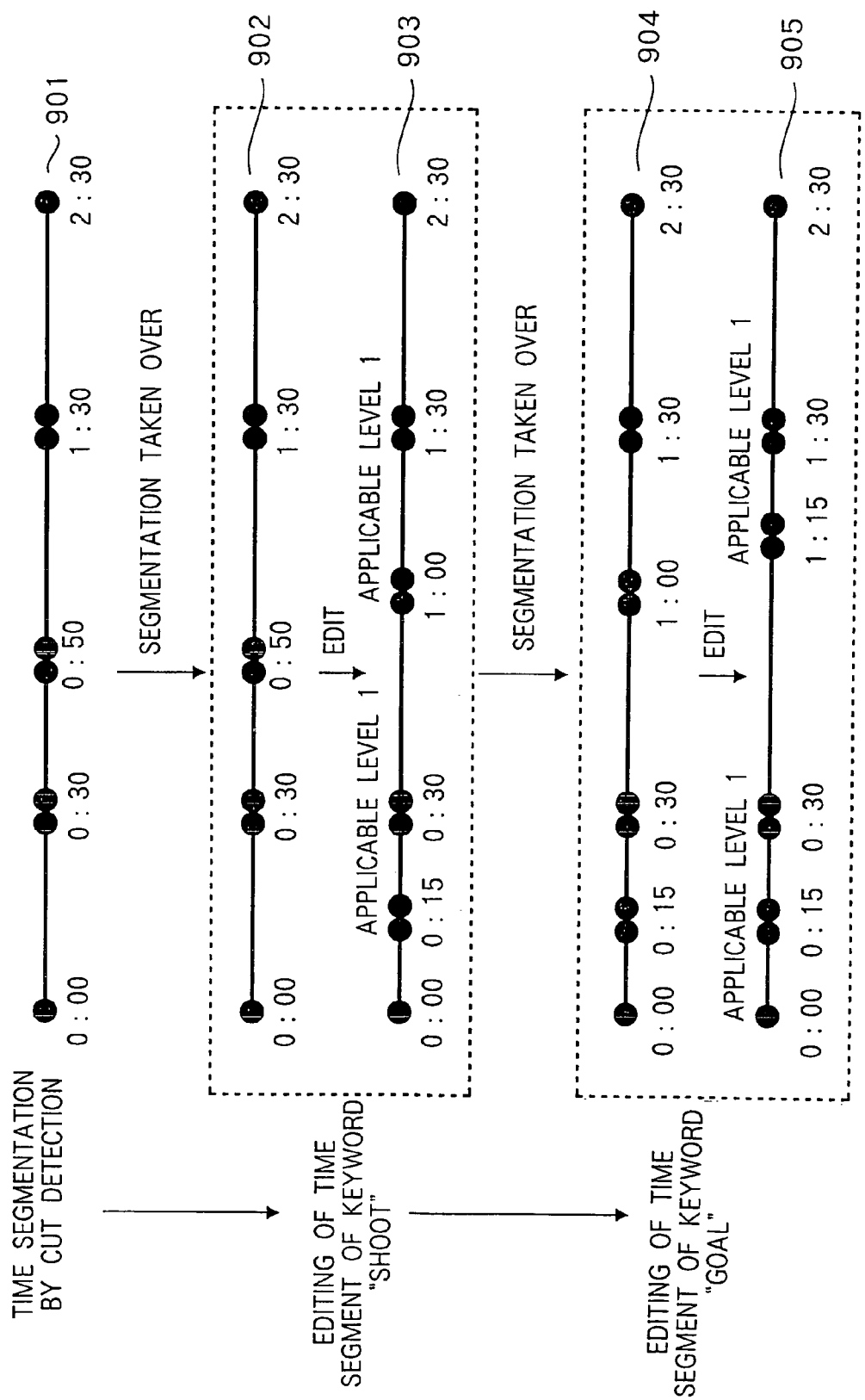
FIG. 9 is a conceptual diagram of scene time takeovers according to Embodiment 1.

Hereafter, length adjustment of each scene by the authoring apparatus 100 will be explained using FIG. 8 and FIG. 9. FIG. 8 is a flow chart of scene length adjustment by the authoring apparatus according to Embodiment 1 and FIG. 9 is a conceptual diagram of scene time takeovers according to Embodiment 1.

The GUI processing section 110 of the authoring apparatus 100 selects a keyword associated with a picture first (ST701) when starting to adjust a scene length. Then, the GUI processing section 110 decides in ST701, whether the scene length adjustment operation on the selected keyword is performed for the first time or not (ST702).

Then, when it is decided in ST702 that the scene length adjustment processing on the keyword selected in ST701 is not performed for the first time, the GUI processing section 110 reads the time information previously adjusted for this keyword (ST703).

Then, the GUI processing section 110 displays the GUI 301 which reflects the metadata for which a time adjustment was previously made with this keyword (ST704). That is, the GUI processing section 110 arranges the scenes for which time adjustments were previously made with this keyword in the main window 302.

Then, when the user operates the division window 312 while watching the GUI 301 displayed in ST704 to adjust start and end points of each scene, the GUI processing section 110 performs time adjustment of each scene using information adjusted by the user (ST705).

Then, when there are keywords which have not been processed yet and applicable levels are continued to be assigned to other keywords (ST706), the GUI processing section 110 moves back to the processing in ST701.

On the other hand, when it is decided in ST702 that the time adjustment processing on the keyword selected in ST701 is performed for the first time, the GUI processing section 110 decides whether there is any time data for which a time adjustment was made with other keywords (ST707).

Then, when it is decided in ST707 that there is no time data for which a time adjustment was made with other keywords, the GUI processing section 110 moves on to ST704 and performs normal assignment of applicable levels as shown in FIG. 5.

On the other hand, when it is decided in ST707 that there is time data for which time adjustment was previously made with other keywords, there is time data about the last operation carried out on this keyword, and therefore the GUI processing section 110 performs time data takeover processing on this keyword operated the last time (ST708) and moves on to the processing in ST704.

Then, the time data takeover processing in ST708 will be explained using FIG. 9. The figure shown by reference numeral 901 illustrates the time segmentation of a scene automatically subjected to cut-detection and segmented by the GUI processing section 110.

In the authoring operation with the first keyword, the time segments of the scene automatically detected as indicated by 901 in the figure are taken over as indicated by 902 in the figure. In this example, suppose the first keyword is "shoot."

Then, the user moves to the start/end time of the scene corresponding to "shoot" and adjustment processing on the applicable level. In this example, the user modifies the start/end time of the scene corresponding to "shoot" into the start/end time indicated by 903 in the figure and designates time 0:15 to 0:30 and 1:00 to 1:30 as applicable level 1.

Then, the user performs an operation of assigning the start/end time and applicable levels to other keywords. In this example, the user performs an operation of assigning the start/end time and applicable levels to the keyword "goal." In this case, according to this embodiment, the start/end time indicated by 903 is taken over and the start/end time indicated by 904 in the figure is set.

Then, on the start time information indicated by 904 in the figure, the user performs editing of the start/end time and applicable levels for another keyword ("goal"). In this example, as indicated by 905 in the figure, applicable level 1 is assigned to 1:15 to 1:30.

Thus, when applicable levels are assigned to a plurality of keywords, the operation efficiency is improved by taking over time segments of a previous keyword.

As explained above, according to Embodiment 1, by setting predetermined keywords, displaying a matrix plane with the horizontal axis representing a time axis and the vertical axis representing an applicable level and arranging scene frame images indicating picture scenes arranged on this matrix plane at desired positions, it is possible to determine the applicable level to a specific keyword of the picture scene. Furthermore, since the state of the applicable level of the picture scene can be visually easily grasped by taking into account a time sequence, it is possible to distribute applicable levels through simple operations. This improves the efficiency of authoring operation.

Furthermore, according to Embodiment 1, when applicable levels for a plurality of different keywords are determined successively, segmentation of a picture scene of a keyword being currently operated can take over the previous segmentation of the keyword operated the last time. This eliminates the need for redundant segmentation operation on the time axis and thereby improves the efficiency of the authoring operation.

Furthermore, Embodiment 1 can display a total time of picture scenes for each applicable level. This makes it possible to visually grasp a total time of picture scenes and assign the applicable levels while recognizing the length of the total time and determining the distribution of the applicable levels. This results in an improvement of the efficiency of the authoring operation.

Furthermore, using scene frame images extracted from a moving image as identifiers of picture scenes to be arranged on a matrix plane (main window 302) consisting of a time axis and applicable levels, Embodiment 1 can decide the contents of the picture scenes from the scene frame images.

Here, the identifiers are not necessarily limited to scene frame images. For example, it is also possible to use features such as a scene frame ID and color, shape or contents of a scene frame as an identifier instead of a scene frame image.

Furthermore, Embodiment 1 has been explained using an example of authoring for a moving image file, but the present invention is also effective for a file consisting of only speech. That is, when pieces of information which can identify a part of a file such as features of speech and serial number ID are arranged instead of scene frame images, an authoring operation similar to that of a moving image file is available.

Furthermore, Embodiment 1 has described assignment of applicable levels of scenes to a keyword, but it is also possible to adopt a mode in which applicable levels can be assigned about not only so-called keywords but also other information. For example, authoring processing may also assign applicable levels for various types of information such as performers, producer and date, etc.

Furthermore, the processing carried out by the authoring processing section 101 according to Embodiment 1 may be programmed and this program may be executed by a computer. In this way, the authoring processing section 101 according to Embodiment 1 can be implemented by a general-purpose computer. In this case, a programming language such as JAVA® may be used and a programming technique of various parts of a GUI is widely known.

Furthermore, it is also possible to assign keywords and applicable levels to each scene by arranging them in a layered structure. For example, it is possible to provide a layered structure among keywords, for example, set a keyword "goal" under a keyword "shoot" and assign those keywords.

Furthermore, Embodiment 1 has described a mode in which a digest picture is created using a desired keyword and applicable level for one file, but it is also possible to adopt a mode in which a digest picture is created using a plurality of files by simultaneously using a desired keyword and applicable level for a plurality of files.

Furthermore, the authoring apparatus 100 is also applicable to a personal computer (video editing apparatus), freestanding (HDD) video cassette recorder (home server), portable video camera, etc.

When the authoring apparatus 100 is applied to a (1) personal computer, a liquid crystal display or CRT, etc., is used as the display section 105, a mouse and keyboard, etc., as the operation section 106, a hard disk or server, etc., as the storage section 102 and a CD drive, DVD drive or network, etc., as the moving image file input section 113.

When the authoring apparatus 100 is applied to a (2) freestanding (HDD) video cassette recorder (home server), a TV, liquid crystal panel, etc., is used as the display section 105, a main button, remote control, etc., as the operation section 106, a hard disk, DVD-RAM, etc., as the storage section 102 and broadcasting, DVD drive, network, etc., as the moving image file input section 113.

When the authoring apparatus 100 is applied to a (3) portable video camera, a liquid crystal monitor, etc., is used as the display section 105, main button or remote control, etc., as the operation section 106, a video cassette, DVD-RAM or memory card, etc., as the storage section 10 and a CCD camera, etc., as the moving image file input section 113.

Embodiment 1 has been explained as having a configuration in which the GUI processing section 110 has the function as a display control section that arranges and displays the scene frame images 303a to 303d which are identifiers indicating scenes obtained by dividing a moving image file into predetermined segments on the main window 302 which is a matrix plane and the function as an applicable level decision section that decides, when the positions of the scene frame images 303a to 303d arranged in the main window 302 are moved, the applicable levels corresponding to the positions of the moved scene frame images 303a to 303d as the applicable levels of the scenes corresponding to the moved scene frame images 303a to 303d, but it is also possible to adopt a configuration in which the display control section and the applicable level decision section are separately provided as dedicated processing sections.

Embodiment 2

Embodiment 2 of the present invention is enabled to assign a keyword to a predetermined segment of a picture in real time while viewing the picture. Embodiment 2 is further enabled to simultaneously assign applicable levels corresponding to a plurality of different keywords to a picture.

An authoring apparatus according to Embodiment 2 will be explained below. The configuration of the authoring apparatus according to Embodiment 2 is the same as that of Embodiment 1, and therefore explanations thereof will be omitted.

Figure 10:
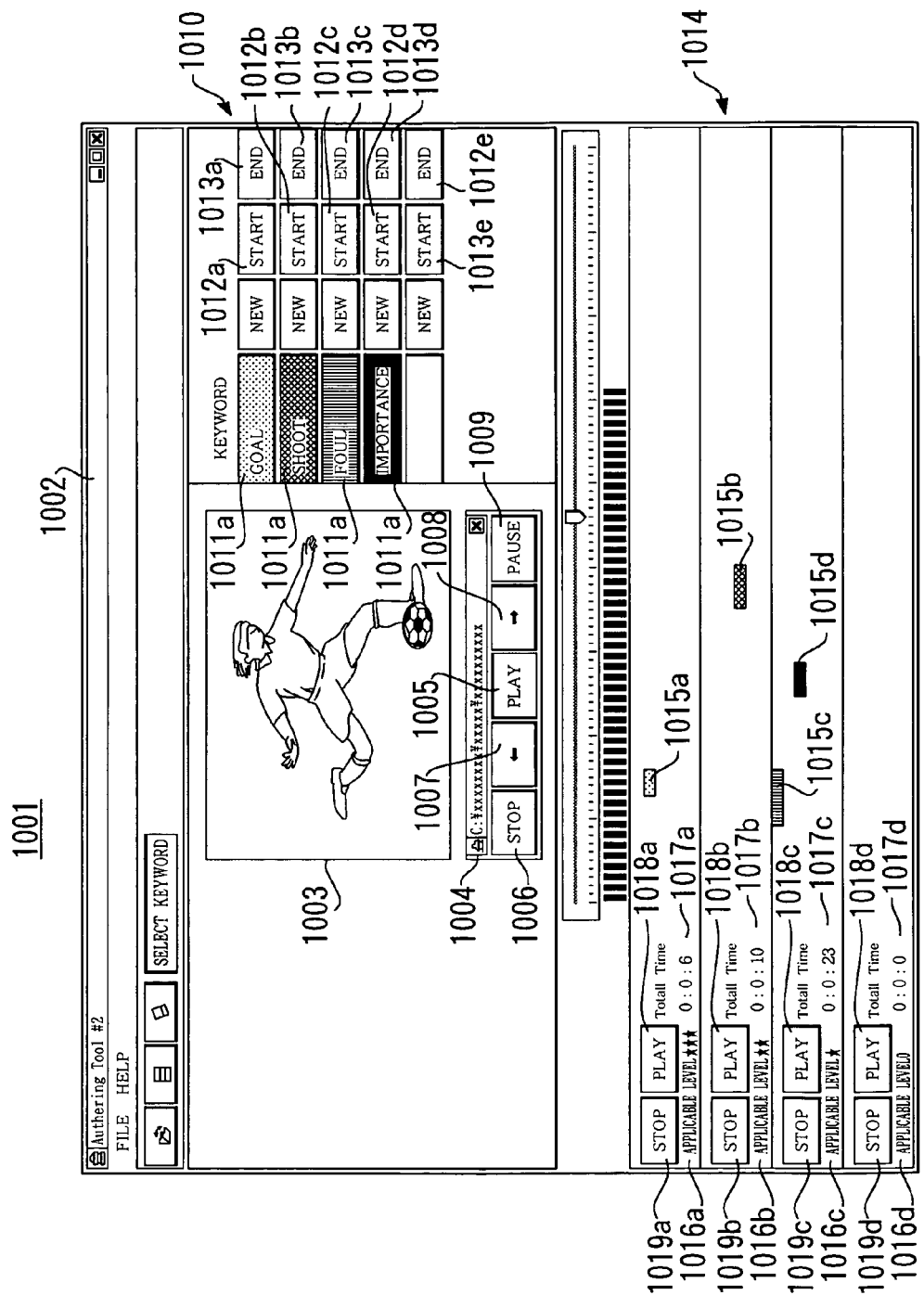
FIG. 10 illustrates a configuration of a GUI according to Embodiment 2 of the present invention.

Then, a GUI of Embodiment 2 is shown in FIG. 10 and features of the GUI of Embodiment 2 will be explained. FIG. 10 illustrates a configuration of the GUI according to Embodiment 2.

A moving image reproduction window 1003 is placed at the top center of a main window 1002 of the GUI 1001 according to Embodiment 2.

Furthermore, a moving image control panel 1004 is placed near below the moving image reproduction window 1003.

The moving image control panel 1004 is provided with a Play button 1005 that reproduces a moving image in the moving image reproduction window 1003, a Stop button 1006 that stops the moving image, a frame rewind button 1007 that rewinds frames of the moving image, a frame advance button 1008 that advances frames of the moving image and a Pause button 1009 that pauses the moving image, and can thereby control reproduction of the moving image to be subjected to authoring.

Furthermore, a keyword table 1010 that lists keywords to be used for authoring is placed to the right of the moving image reproduction window 1003 of the main window 1002. The keyword table 1010 is provided with a plurality of keyword fields 1011a to 1011e to set a plurality of keywords.

In the example of this figure, keywords such as "goal", "shoot", "foul" and "importance" are set as keywords in the respective fields 1011a to 1011e. Furthermore, the keyword fields 1011a to 1011e of the keyword table 1010 are color-coded.

Furthermore, start buttons 1012a to 1012e to start assignment of keywords to a moving image being reproduced in the moving image reproduction window 1003 and stop buttons 1013a to 1013e to stop assignment of keywords are arranged to the right of the keyword fields 1011a to 1011e of the keyword table 1010.

Furthermore, a matrix plane 1014 with applicable levels corresponding to the keywords arranged on the vertical axis and a time axis on the horizontal axis is placed in the lower part of the main window 1002.

On the matrix plane 1014, when the keyword table 1010 is operated through an authoring operation and keywords are assigned, time bars 1015a to 1015d which are identifiers indicating assignment of keywords are arranged at corresponding time positions of the matrix plane 1014. Furthermore, the colors of the time bars 1015a to 1015d correspond to the colors of the keyword fields 1011a to 1011e. Furthermore, the lengths of the time bars 1015a to 1015d are proportional to the length of the actual picture.

Furthermore, a plurality of applicable levels 1016a to 1016d is described in ascending order in the vertical direction on the left side of the matrix plane 1014.

Furthermore, total times 1017a to 1017d of pictures included in their respective applicable levels 1016a to 1016d are described near to the right of the applicable levels 1016a to 1016d.

Furthermore, Play buttons 1018a to 1018d to reproduce digest pictures created using the respective applicable levels 1016a to 1016d and Stop buttons 1019a to 1019d are arranged above the applicable levels 1016a to 1016d.

Figure 11:
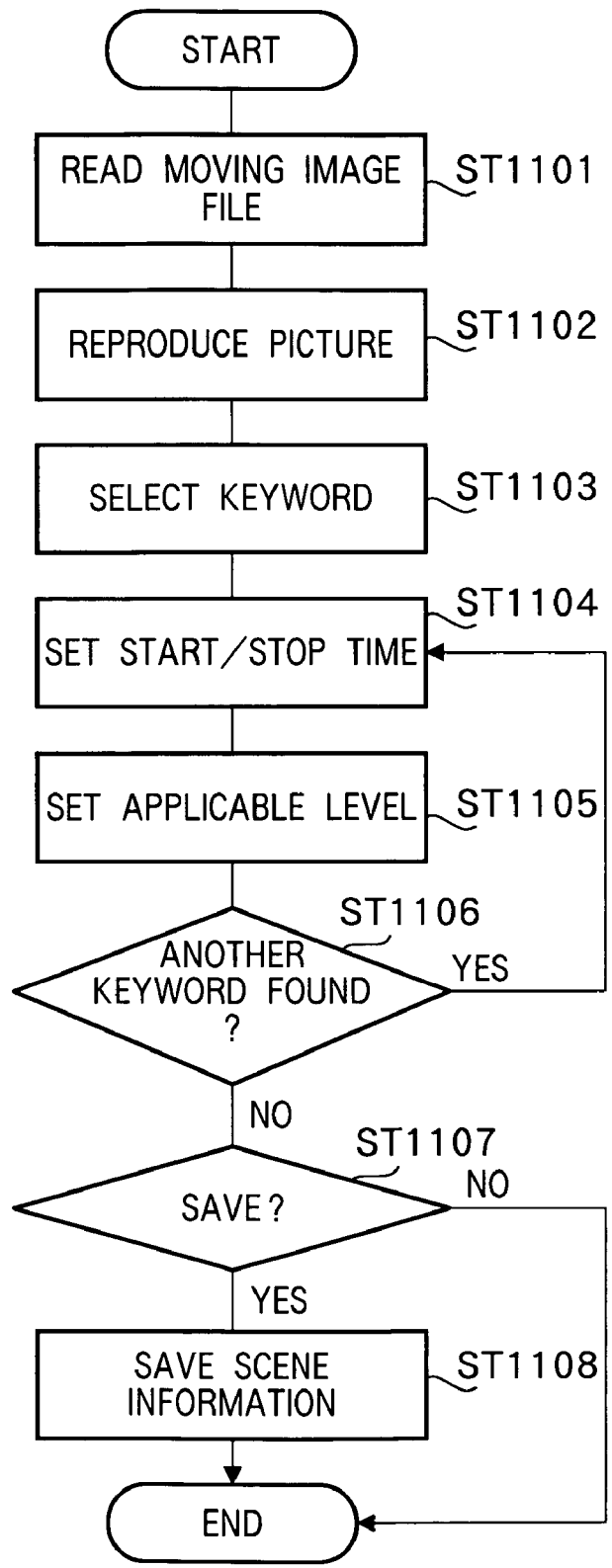
FIG. 11 is a flow chart of authoring processing by an authoring apparatus according to Embodiment 2.

Then, the operation of the authoring apparatus according to Embodiment 2 will be explained using FIG. 10 and FIG. 11. FIG. 11 is a flow chart of authoring processing by the authoring apparatus according to Embodiment 2.

First, when the user selects a picture file from a moving image file 103 and presses the Play button 1005, a moving image reproduction section 109 reads the selected picture file (ST1101) and reproduces the read picture in the moving image reproduction window 1003 (ST1102).

Then, when the user selects any one keyword from the keyword fields 1011a to 1011e of the keyword table 1010 (ST1103) and presses the start button 1012a to 1012e and stop button 1013a to 1013e, a GUI processing section 110 sets the keyword selected by the user to the time corresponding to the start button 1012a to 1012e and stop button 1013a to 1013e pressed by the user (ST1104).

Then, the GUI processing section 110 draws the time bars 1015a to 1015d with the color corresponding to the keyword field 1011a to 1011e selected by the user on the matrix plane 1014.

In this way, since the keyword selected by the user and the time bar 1015a to 1015d displayed have the same color, it is possible to recognize at a glance which keyword corresponds to which time bar 1015a to 1015d.

Furthermore, the time bars 1015a to 1015d are shown in lengths corresponding to their respective durations after the user presses the start buttons 1012a to 1012e until the user presses stop buttons 1013a to 1013e, and therefore it is possible to recognize at a glance with which time segment the keyword is associated.

Then, as in the case of Embodiment 1, when the user drags & drops the time bars 1015a to 1015d displayed up and down on the matrix plane 1014 to set the applicable levels 1016a to 1016d (ST1105), the GUI processing section 110 associates the applicable levels 1016a to 1016d with the time bars 1015a to 1015d set by the user.

Furthermore, when the user selects a plurality of keywords during the same time segment, the time bars 1015a to 1015d overlap with one another and it becomes difficult to distinguish from one another, and therefore the time bars 1015a to 1015d are arranged shifted from one another in the vertical direction of the matrix for each keyword to prevent them from overlapping with one another.

When the user further inputs another keyword, the GUI processing section 110 repeats processes from ST1103 to ST1105 (ST1106).

Then, when the authoring operation is completed, if the user selects to save the information edited as shown above (ST1107), a metadata editing section 112 saves the edited scene information (ST1108) and finishes the processing.

As explained above, according to Embodiment 2, it is possible to display a plurality of keywords assigned through an authoring operation and color-coded on the GUI 1001 and further arrange time bars in colors corresponding to keywords selected by the user on the matrix plane 1014. This allows applicable levels to be assigned to a plurality of different keywords simultaneously.

Furthermore, according to Embodiment 2, it is possible to arrange time bars in colors corresponding to keywords to be assigned through the authoring operation on the matrix plane 1014, and therefore the user can visually recognize the correspondence between the time bars and keywords and easily grasp the situation of operation, which improves the efficiency of the operation.

Furthermore, according to Embodiment 2, the user can assign a predetermined keyword to a predetermined segment (picture scene) of a picture in real time by pressing the start button 1012 and stop button 1013 while watching the picture. The user can also assign applicable levels while recognizing time bars which are identifiers of the picture scenes on the matrix plane.

In Embodiment 2, colors are used to show a relationship with keywords, but colors are not the only means. For example, instead of colors such as red, blue and white, monochrome patterns such as shading, half-tone may also be used.

Furthermore, the shape of time bars may be graphic patterns such as wavy line and doublet instead of rectangle and the graphic patterns may be associated with keywords.

This application is based on the Japanese Patent Application No. 2002-160528 filed on May 31, 2002, entire content of which is expressly incorporated by reference herein.

Industrial Applicability

As explained above, the present invention displays identifiers corresponding to picture scenes on a plane having applicable levels on the vertical axis and time on the horizontal axis, operates these identifiers on this plane and can assign keywords and applicable levels corresponding to these keywords to the picture scenes, and can thereby improve the operability in assignment of keywords and applicable levels of the picture scenes and visually confirm the situation of assignment of the keywords and applicable levels.

What is claimed is:

1. An authoring apparatus, comprising:
   a memory that stores at least one moving image file;
   a display that arranges and displays time information and representative images as identifiers, respectively, indicating a plurality of scenes obtained by dividing a moving image file into predetermined segments, for each of predetermined keywords corresponding respectively to the plurality of scenes,
   the time information and respective images being arranged and displayed on a matrix plane, on which a time axis and an axis showing applicable levels of importance of the plurality of scenes with respect to a predetermined keyword are provided orthogonal to each other, the matrix plane having a plurality of predefined sections, each section corresponding to one of the applicable levels of importance, and said representative images being displayed in a state where each representative image is arranged and displayed in one of the predefined sections corresponding to the applicable levels of importance;
   a moving image reproducer that reproduces the moving image file;
   a keyword display that displays a list of a plurality of keywords;
   a keyword selector that selects a predetermined keyword from among the plurality of keywords;
   a keyword starter that is set per keyword and starts assigning the predetermined keyword to the moving image file;
   a keyword stopper that is set per keyword and stops assigning the predetermined keyword to the moving image file;
   a keyword assignor that converts, when there is an input from the keyword starter and the keyword stopper during reproduction of the moving image file, a moving image file corresponding to a segment between the input from the keyword starter and the input from the keyword stopper, to a scene and assigns the predetermined keyword to the scene;
   a graphical user interface (GUI) processor that determines, when an assigned applicable level of a scene is changed by dragging and moving a representative image from a first predefined section to a second predefined section on the matrix plane, the changed applicable level indicating importance and time information of the scene in the second predefined section to which said representative image is moved with respect to said predetermined keyword; and
   a metadata editor that generates metadata of the scene corresponding to the moved representative image, the metadata comprising said changed applicable level showing importance and said time information of the scene with respect to said predetermined keyword determined by said graphical user interface processor,
   wherein the metadata comprises the plurality of scenes, the plurality of scenes each being assigned time information, keywords to specify the scenes, applicable levels of importance, and said representative images or links of the scenes, and wherein the keyword display displays keywords with different colors or shadings per keyword and displays the identifiers on the matrix plane using a display form of a color or a shading used for the keyword corresponding to the identifier.

2. The authoring apparatus according to claim 1, wherein when said applicable level is assigned to said identifier, said GUI processor arranges and displays said identifier at a position on said matrix plane corresponding to said applicable level.

3. The authoring apparatus according to claim 1, further comprising an operation section that inputs said keyword, wherein said display displays said identifier on a matrix plane on which the time axis and the axis of the applicable level corresponding to said keyword input from said operation section are orthogonal to each other and said GUI processor determines the applicable level corresponding to said keyword input for said identifier.

4. The authoring apparatus according to claim 1, wherein said GUI processor displays information showing the length of said scene near said identifier corresponding to said scene.

5. The authoring apparatus according to claim 1, wherein said GUI processor displays a total time of a digest picture obtained by combining said scenes having levels equal to or higher than said applicable level corresponding to said predetermined keyword, on said matrix plane.

6. The authoring apparatus according to claim 1, wherein said GUI processor edits said time information by dragging and moving one of the plurality of representative images, by a user, arranged on said matrix plane such that the one of the plurality of representative images overlaps another representative image, and combines a scene corresponding to the one of the plurality of representative images and a scene corresponding to the another representative image to generate a new scene.

7. The authoring apparatus according to claim 1, wherein, when instructed to reproduce said scene corresponding to said identifier arranged on said matrix plane and to divide said scene at predetermined positions, said GUI processor divides said scene at said predetermined positions and generates a plurality of new scenes.

8. The authoring apparatus according to claim 1, wherein, when said GUI processor determines said applicable level corresponding to said predetermined keyword for said scene divided into predetermined units corresponding to said predetermined keyword and then determines an applicable level corresponding to another keyword for the scene, each scene takes over segmentation of the scene corresponding to said predetermined keyword.

9. The authoring apparatus according to claim 1, wherein said metadata is created based on a Moving Picture Experts Group (MPEG) 7 standard.

10. An authoring apparatus, comprising:
a memory that stores at least one moving image file;
a matrix display that arranges and displays time information and identifiers, respectively, indicating a plurality of scenes obtained by dividing a moving image file into predetermined segments, for each of predetermined keywords corresponding respectively to the plurality of scenes,
the time information and identifiers being arranged and displayed on a matrix plane, on which a time axis and an axis showing applicable levels of importance of plurality of scenes with respect to a predetermined keyword are provided orthogonal to each other, the matrix plane having a plurality of defined sections, each section corresponding to one of the applicable levels of importance, and the identifiers being displayed in a state where each identifier is arranged and displayed in one of the predefined sections corresponding to the applicable levels of importance;
a moving image reproducer that reproduces the moving image file;
a keyword display that displays a list of a plurality of keywords;
a keyword selector that selects a predetermined keyword from among the plurality of keywords;
a keyword starter that is set per keyword and starts assigning the predetermined keyword to the moving image file;
a keyword stopper that is set per keyword and stops assigning the predetermined keyword to the moving image file;
a keyword assignor that converts, when there is an input from the keyword starter and the keyword stopper during reproduction of the moving image file, a moving image file corresponding to a segment between the input from the keyword starter and the input from the keyword stopper, to a scene and assigns the predetermined keyword to the scene;
a graphical user interface (GUI) processor that arranges and displays an identifier indicating the scene on the matrix plane and determines, when an assigned applicable level of the scene is changed by dragging and moving an identifier from a first predefined section to a second predefined section on the matrix plane, the changed applicable level showing importance and time information of the scene in the second predefined section to which the identifier is moved with respect to the predetermined keyword; and
a metadata editor that generates metadata of the scene corresponding to the moved identifier, the metadata comprising said changed applicable level showing importance and said time information of the scene with respect to the predetermined keyword determined by said graphical user interface processor,
wherein the metadata comprises a plurality of scenes, the plurality of scenes each being assigned time information, keywords to specify the scenes, applicable levels of importance, and representative images or links of the scenes, and wherein the keyword display displays keywords with different colors or shadings per keyword and displays the identifiers on the matrix plane using a display form of a color or a shading used for the keyword corresponding to the identifier.

11. The authoring apparatus according to claim 10, wherein the lengths of said identifiers correspond to a length of the scene.

12. An authoring method, comprising:
storing at least one moving image file;
arranging and displaying time information and representative images as identifiers, respectively, indicating a plurality of scenes obtained by dividing a moving image file into predetermined segments, for each of predetermined keywords corresponding respectively to the plurality of scenes,
reproducing the moving image file;
displaying a list of a plurality of keywords;
selecting a predetermined keyword from among the plurality of keywords;
starting the assigning of the predetermined keyword to the moving image file, the starting being set per keyword;
stopping the assigning of the predetermined keyword to the moving image file, the stopping being set per keyword;
converting, when there is an input from the starting and the stopping during reproduction of the moving image file, a moving image file corresponding to a segment between the input from the starting and the input from the stopping, to a scene and assigning the predetermined keyword to the scene;
the time information and representative images being arranged and displayed on a matrix plane, on which a time axis and an axis showing applicable levels of importance of the plurality of scenes with respect to a predetermined keyword are provided orthogonal to each other, the matrix plane having a plurality of predefined sections, each section corresponding to one of the applicable levels of importance, and said representative images being displayed in a state where each representative image is arranged and displayed in one of the predefined sections corresponding to the applicable levels of importance;
determining, when an assigned applicable level of a scene is changed by dragging and moving a representative image from a first predefined section to a second predefined section on the matrix plane, the changed applicable level indicating importance and time information of the scene in the second predefined section to which said representative image is moved with respect of the scene with respect to the predetermined keyword; and
generating metadata of the scene corresponding to the moved representative image, the metadata comprising said changed applicable level showing importance and said time information of the scene with respect to the predetermined keyword,
wherein the metadata comprises the plurality of scenes, the plurality of scenes each being assigned time information, a keyword to specify the scenes, the applicable levels of importance, and said representative images or links of the scenes, and wherein the displaying displays keywords with different colors or shadings per keyword and displays the identifiers on the matrix plane using a display form of a color or a shading used for the keyword corresponding to the identifier.

13. A non-transitory computer-readable storage medium storing a computer-readable program, the computer-readable program comprising:

in a computer, arranging and displaying time information and representative images as identifiers, respectively, indicating a plurality of scenes obtained by dividing a moving image file into predetermined segments, for each of predetermined keywords corresponding respectively to the plurality of scenes, the memory image file stored in a memory;

reproducing the moving image file;

displaying a list of a plurality of keywords;

selecting a predetermined keyword from among the plurality of keywords;

starting the assigning of the predetermined keyword to the moving image file, the starting being set per keyword;

stopping the assigning of the predetermined keyword to the moving image file; the stopping being set per keyword;

converting, when there is an input from the starting and the stopping during reproduction of the moving image file, a moving image file corresponding to a segment between the input from the starting and the input from the stopping, to a scene and assigning the predetermined keyword to the scene;

the time information and representative images being arranged and displayed on a matrix plane, on which a time axis and an axis showing applicable levels of importance of the scenes with respect to a predetermined keyword are provided orthogonal to each other, the matrix plane having a plurality of predefined sections, each section corresponding to one of the applicable levels of importance, and said representative images being displayed in a state where each representative image is arranged and displayed in one of the predefined sections corresponding to the applicable levels of importance;

determining, when an assigned applicable level of a scene is changed by dragging and moving a representative image from a first predefined section to a second predefined section on the matrix plane, the changed applicable level indicating importance and time information of the scene in the second predefined section to which the representative image is moved, with respect to the predetermined keyword; and generating metadata of the scene corresponding to the moved identifier, the metadata comprising said changed applicable level showing importance and said time information of the scene with respect to predetermined keyword, wherein the metadata comprises the plurality of scenes, the plurality of scenes each being assigned time information, a keyword to specify the scenes, the applicable levels showing importance and time information of the scenes, and representative images or links of the scenes, and wherein the displaying displays keywords with different colors or shadings per keyword and displays the identifiers on the matrix plane using a display form of a color or a shading used for the keyword corresponding to the identifier.

14. The authoring apparatus according to claim 1, wherein changing the importance with respect to the keyword is executed by moving the position of the representative image on the matrix plane by drag and drop operations.

15. An authoring apparatus according to claim 1, further comprising a visual indicator associated with each representative image that provides a visual indication of time information associated with said each representative image.

\* \* \* \* \*

UNITED STATES PATENT AND TRADEMARK OFFICE
CERTIFICATE OF CORRECTION

| | | |
|---|---|---|
| PATENT NO. | : 7,849,406 B2 | Page 1 of 1 |
| APPLICATION NO. | : 10/491903 | |
| DATED | : December 7, 2010 | |
| INVENTOR(S) | : Okada et al. | |

It is certified that error appears in the above-identified patent and that said Letters Patent is hereby corrected as shown below:

On the Cover page, PCT Pub. No.: (87), line 1, "WO03/002953" should read --WO03/102953--.

Signed and Sealed this
Fifth Day of April, 2011

David J. Kappos
*Director of the United States Patent and Trademark Office*